Jan. 12, 1943.  E. F. KOHL  2,307,797
CLUTCH AND LIQUID TRANSFER MEANS THEREFOR
Filed Dec. 14, 1939  4 Sheets-Sheet 1

INVENTOR
EVERARD F. KOHL
BY
Hyde and Meyer
ATTORNEYS

Jan. 12, 1943.     E. F. KOHL     2,307,797
CLUTCH AND LIQUID TRANSFER MEANS THEREFOR
Filed Dec. 14, 1939     4 Sheets-Sheet 2

INVENTOR
EVERARD F. KOHL
BY
*Hyde and Meyer*
ATTORNEYS

Jan. 12, 1943.  E. F. KOHL  2,307,797
CLUTCH AND LIQUID TRANSFER MEANS THEREFOR
Filed Dec. 14, 1939  4 Sheets-Sheet 3
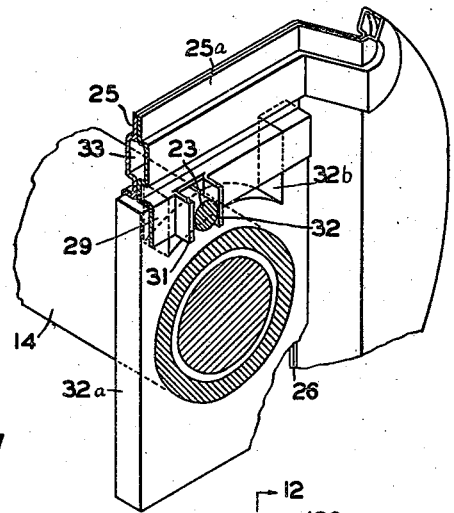
FIG.-7
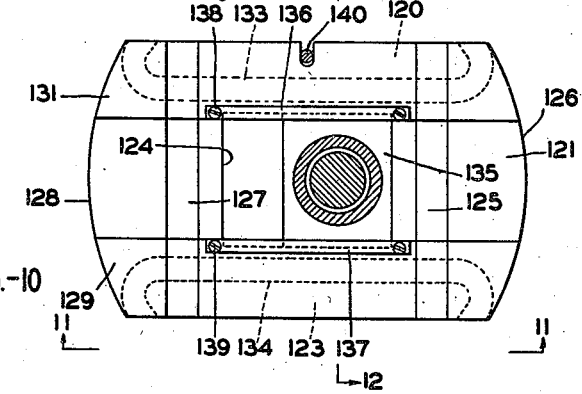
FIG.-10
FIG.-11
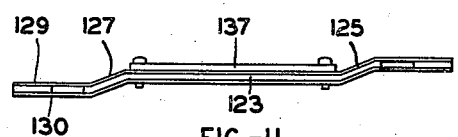
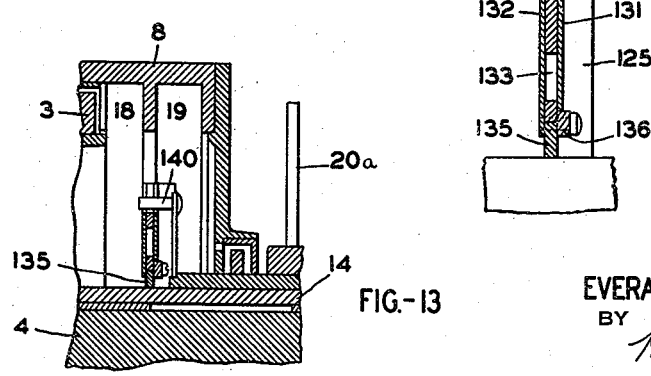
FIG.-12
FIG.-13
INVENTOR
EVERARD F. KOHL
BY
*Hyde and Meyer*
ATTORNEYS Jan. 12, 1943.  E. F. KOHL  2,307,797
CLUTCH AND LIQUID TRANSFER MEANS THEREFOR
Filed Dec. 14, 1939  4 Sheets-Sheet 4

INVENTOR
EVERARD F. KOHL
BY Hyde and Meyer
ATTORNEYS

Patented Jan. 12, 1943

2,307,797

UNITED STATES PATENT OFFICE 2,307,797

CLUTCH AND LIQUID TRANSFER MEANS THEREFOR

Everard F. Kohl, Cleveland, Ohio

Application December 14, 1939, Serial No. 309,271

24 Claims. (Cl. 192—85)

My invention relates to clutches of the liquid actuated type and more particularly to improved means for controlling the operation of such clutches.

In clutches of the liquid type in which a body of a suitable liquid, such as mercury, is utilized for effecting a driving connection between a driving member and a member to be driven, it is desirable to provide means operable from a central point to engage or release the clutch or to effect a change in the operation of the clutch to transmit power at different speeds or to provide means for driving an external shaft in opposite directions. According to my invention intercommunicating chambers are provided in a housing associated with the clutch and means are provided to transfer the liquid from one chamber to another, thereby engaging or throwing the clutch into neutral position or effecting a change in the operation of the clutch to provide a change in speed or direction of rotation of a driven shaft associated with the clutch.

It is therefore an object of my invention to provide a liquid actuated clutch structure in which improved means are provided for either effecting a driving connection between the driving and one or more driven members or for throwing the clutch into neutral position.

Another object of my invention is to provide an improved liquid transfer apparatus for effecting a transfer of the liquid from one chamber to another in a liquid clutch assembly during the operation of the driving shaft.

A further object of my invention is to provide an improved liquid actuated clutch structure having a driving member and a plurality of driven members including means for effecting a driving engagement between the driving member and any one or more of the driven members.

Another object of my invention is to provide an improved clutch structure including a driving member and a plurality of driven members in which improved means are provided for effecting a driving engagement between one or more of said driven members and the driving member or disengaging all of said driven members from the driving member.

A further object of my invention is to provide an improved control means associated with a liquid actuated clutch structure which may be simply and easily actuated.

Another object of my invention is to provide a control means associated with a liquid actuated clutch structure by means of which the time of engagement of the driving member and the member or members to be driven may be controlled or regulated.

A still further object of my invention is to provide a control means for clutches of the liquid type by means of which the capacity of the clutch may be varied or limited.

Other objects and advantages of my invention will be apparent as the description proceeds.

My invention will be better understood by refernce to the accompanying drawings, in which Fig. 1 is a composite view of one form of a clutch embodying my invention, the lower part of the view being a side elevation and the upper part being a central longitudinal section;

Fig. 7 is a perspective view of a portion of the liquid transfer device showing it slidably mounted upon a guide formed upon a stationary shaft;

Fig. 10 is a side elevational view of a modified form of a liquid transfer device;

Fig. 11 is an end view of the device shown in Fig. 10 as viewed from a plane passing through line 11—11 of Fig. 10;

Fig. 12 is a fragmentary cross sectional view on the line 12—12 of Fig. 10; and

Fig. 13 is a fragmentary sectional view of a portion of a clutch showing the modified liquid transfer means slidably mounted upon a guide formed upon a stationary shaft.

In clutches of the liquid type, such as the clutch disclosed in Patent No. 1,972,741 granted to me on September 4, 1934, it is frequently desirable to operate the clutch from a central point to engage or disengage the clutch or to drive an external shaft operatively associated with the clutch at different speeds or in alternatively reverse directions. It is the aim of the present invention to provide control means located exteriorly of the clutch housing which may be operated in a simple manner to connect the driving member to the driven member or to shift the clutch into a neutral position in which the driving member is rotated independently of the member to be driven. My improved control means is also effective in varying or limiting the capacity of the clutch and controlling or regulating the time of engagement or disengagement of the clutch.

My invention also contemplates providing a plurality of driven members which may be alternatively or simultaneously connected to the driving member and each of which may be provided at its opposite end with a gear of the desired ratio, thus providing means for operating an external shaft at various speeds, or the gear on one of the driven shafts may be connected through a suitable train of gears to operate the external shaft in a direction reverse to the direction it is driven by the gear on the other driven shaft.

Figure 1:
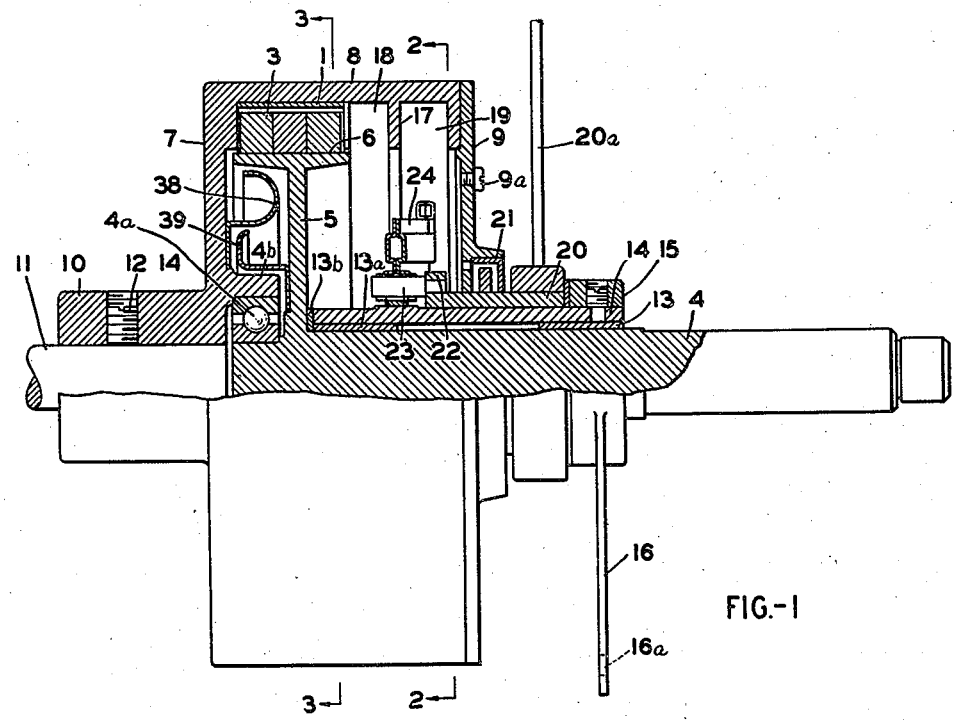
Figure 2:
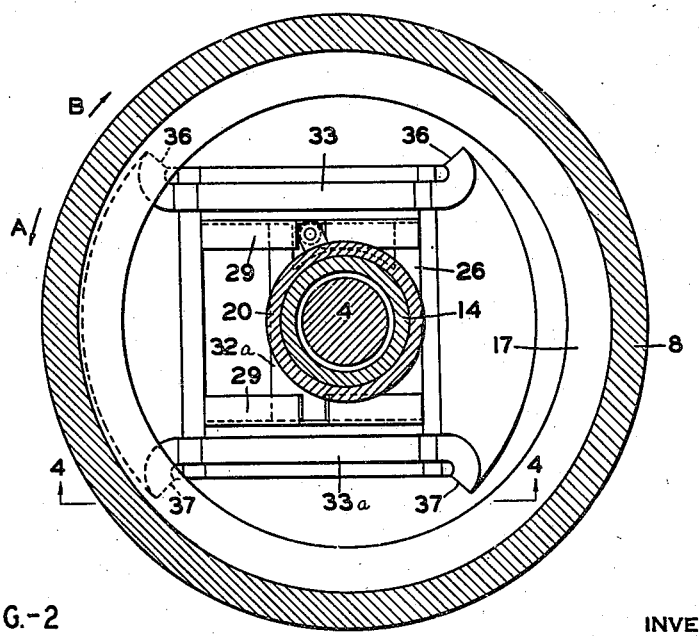
Fig. 2 is a cross sectional view on the line 2—2 of Fig. 1 showing a side elevational view of my improved liquid transferring apparatus.
Figure 3:
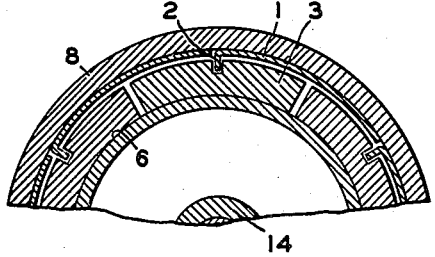
Fig. 3 is a fragmentary sectional view taken on a plane through the line 3—3 of Fig. 1.

While my improved structure may be employed with clutches of various types in which a suitable liquid, such as mercury, is utilized for effecting engagement between the driving member and the member to be driven and any type of liquid transferring means and control device may be employed to effect the engagement and disengagement of the clutch, for purposes of illustration I have shown in Figs. 1 to 3, inclusive, a clutch having a driving member, including an annular housing, the peripheral portion of which is provided with an interior lining 1 having a plurality of inwardly extending flanges 2 as shown in Fig. 3, which are adapted to extend into notches on a plurality of segmental strips 3 formed of any suitable material, such as wood, cork, laminated or molded material, and a shaft 4 to be driven, one end of which extends interiorly of the housing and is provided adjacent its inner end with a peripheral flange 5 having a clutch surface 6 at its outer periphery.

As illustrated, the housing has an end portion 7, an annular peripheral portion 8 and a cover 9 which may be welded or otherwise secured to the peripheral portion. Although the housing may be rotated by any suitable means, such as a pulley, as illustrated in the drawings it is provided with a hub 10 having an interior groove in which a suitable shaft 11 may be splined and held in position by set screw 12. In my improved structure a liquid which is capable of exerting a buoyant effect upon strips 3, such as mercury, is utilized to effect a driving engagement between the driving member and the member to be driven. The liquid may be introduced into the housing through an aperture in cover 9 and the aperture closed by a suitable plug 9a.

As illustrated, the driven shaft 4 is reduced at its inner end and is adapted to rotate in suitable bearings, such as ball bearings 4a, which as shown are held in position by the reduced end of the shaft and an annular flange 4b extending inwardly from the side 7 of the housing, and in bearings 13 and 13a arranged on the interior surface of a stationary sleeve 14, the inner end of which sleeve bears against a washer 13b and the outer end of which is attached to an annular collar 15 provided with a downwardly extending flange 16 having an aperture 16a to receive bolts or screws for attachment to a suitable support.

According to my invention means are provided for engaging and disengaging the driving member and the member to be driven. For this purpose the housing is provided with an inwardly extending peripheral flange 17 forming a main or working chamber 18 and an auxiliary or reserve chamber 19. It will be apparent that when the mercury is in the chamber 19 no driving connection can be established between the driving member and the member to be driven. When sufficient liquid is transferred, however, from the auxiliary chamber 19 to the main chamber 18 as the speed of the driving member increases, the mercury will be gradually picked up by the driving member, and the centrifugal force acting upon the mercury causes it to assume the form of an annulus in the peripheral portion of chamber 18 and the buoyant action of the mercury when it is thus rotating with the driving member forces segmental strips 3 radially inwardly against clutch surface 6 and a driving connection is established between the driving and the driven members.

The capacity of the clutch at a predetermined speed is dependent upon the amount of mercury which is transferred from auxiliary chamber 19 to working chamber 18 and the specific gravity of the material utilized in forming segmental strips 3. To provide a comparatively high capacity with a comparatively small amount of mercury, the segmental strips 3 are preferably formed of a relatively light molded material, such as asbestos fibers bound together by a suitable binder, such as a phenolic condensation product. When the strips are formed of a predetermined material such as that specified, the capacity of the clutch at a predetermined speed may be determined at the will of the operator by the amount of mercury which is transferred to working chamber 18 from auxiliary chamber 19. This is due to the fact that when the housing is rotated the strips 3 are thrown outwardly by centrifugal force against the periphery of the housing and if the amount of mercury which is transferred from auxiliary chamber 19 to working chamber 18 is insufficient by its buoyant action upon the strips 3 to overcome the centrifugal force upon the clutch members, a driving engagement will not be effected. As the quantity of mercury which is transferred from the auxiliary chamber to the working chamber is increased, its buoyant effect is increased and the capacity of the clutch is likewise increased. It will therefore be apparent that when the strips 3 are formed of a predetermined material, the capacity of the clutch at a predetermined speed may be controlled or regulated by the amount of the liquid which is utilized. It is also apparent that when the strips are formed of a different material the amount of liquid, such as mercury, which is utilized to provide a clutch of the desired capacity may be readily determined.

For transferring the mercury between the auxiliary chamber and the main chamber a control device including a sleeve 20 is provided which is rotatably mounted on stationary sleeve 14 and is provided with a lever 20a for this purpose. The inner end of sleeve 20 extends into the housing through an opening in cover 9 which is provided with a suitable seal 21 to prevent escape of the mercury. The inner portion of the sleeve 20 is provided with a lug 22 which forms a support for a bolt or pin 23 which is operatively associated with a suitable liquid transfer device 24.

The liquid transfer device is adapted to be maintained in a neutral position in which it is ineffective in transferring liquid from either chamber to the other or it may be moved by actuation of the control device in one direction to effect a transfer of the desired quantity of liquid from the auxiliary chamber 19 to the main chamber 18 or in the opposite direction from neutral position to effect a transfer of the liquid from the main chamber 18 to the auxiliary chamber 19. It will therefore be apparent that by a simple operation of control lever 20a the clutch may be operated to effect an engagement or disengagement of the driving member and the member to be driven and that the effectiveness of this engagement, or in other words, the capacity of the clutch, is dependent upon the amount of liquid which is transferred.

While any suitable liquid transfer device may be provided for transferring the liquid between the chambers, in Figs. 2, 4, 5 and 7 of the drawings I have shown an improved means which may be constructed in a simple manner and which is effective in operation. As shown in the drawings, the liquid transfer device is formed of two interchangeable stampings 25 and 25a, secured together by any suitable means, such as welding. Each of the stampings has a central opening 26, U-shaped members 27 and 28 adjacent opposite sides, and angle shaped portions extending outwardly from the edge of the openings and thence inwardly beyond the edge of the opening, forming flanges 29, each of which is provided adjacent its central portion with a pair of outwardly extending spaced flanges 31 and 32.

The liquid transfer device may be slidably mounted in any desired manner within the housing 7. As shown it is mounted upon a guide 32a provided with a recess 32b having an arcuate shaped base which guide is fixed to stationary sleeve 14 by any suitable means, such as welding. As will be noted more particularly in Figs. 1, 2 and 7 of the drawings, the flanges 29 engage the upper and lower edges of guide 32a and the spaced flanges 31 and 32 on each stamping are adapted to receive pin 23 which extends through recess 32b on the guide. From the drawings it will be apparent that upon rotation of pin 23 in recess 32b the liquid transfer device may be moved a limited extent from its central position in either direction, the limit being defined by the engagement of the edges of the device adjacent its opening with the opposite end edges of the guide.

Figure 4:
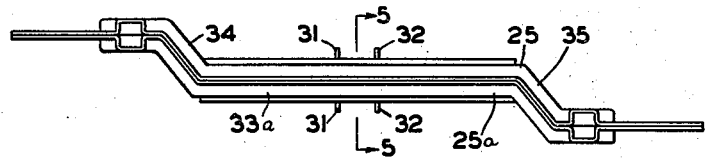
Fig. 4 is an end view of the liquid transferring apparatus as viewed from a plane through the line 4—4 of Fig. 2 looking in the direction of the arrows.
Figure 5:
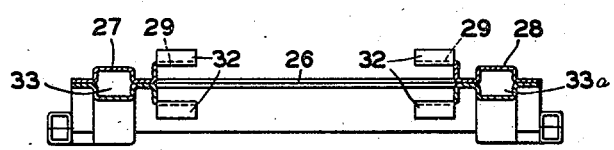
Fig. 5 is a cross sectional view on the line 5—5 of Fig. 4.

As shown in Fig. 4 of the drawings, the outer ends of each stamping are bent in opposite directions as indicated by the numerals 34 and 35 so that one end of the tubular member may be extended into or in proximity to the chamber 18 while the other end portion may be extended into or in proximity to the chamber 19. The end portions of each of the stampings are also constructed in the form of an arc which is substantially concentric to the inner periphery of the housing and the end portions 36 of tubular member 33 are bent outwardly in one direction while the end portions 37 of the tubular member 33a are bent in the opposite direction.

By varying the size of tubular members 33 and 33a, the time required to transfer the liquid from auxiliary chamber 19 to working chamber 18 or in the opposite direction may be controlled or regulated. This is of particular importance because in clutches of a particular type, such as in automobile clutches or extractors, it is desirable to cause a gradually increasing engagement of the clutch member between no load and full load while in other apparatus, such as in lathes or elevator construction it is desirable to provide a quick engagement between the driving member and the driven member. The particular arrangement of tubular members 33 and 33a is also of importance in facilitating the removal of liquid from one chamber and depositing it in the other chamber without causing excessive splashing and this is true irrespective of the direction of rotation of the housing. For instance, if the housing is rotated in the direction indicated by arrow A, as shown in Fig. 2 of the drawings, and one end of tubular member 36 is immersed in the mercury in working chamber 18, the mercury will enter tubular member 33 in a tangential direction and will be transferred through tubular member 33 and discharged into chamber 19 in a tangential direction which is substantially parallel to the direction of rotation of the housing, thus minimizing splashing while substantially no mercury will be transferred through tubular member 33a. On the other hand if the liquid transfer device is moved to insert the opposite ends of tubes 33 and 33a in auxiliary chamber 19 and the housing is rotated in the same direction, mercury will be scooped from chamber 19 and deposited in a tangential direction in the chamber 18 through tubular member 33a. It will be apparent that the same effect will be produced when the housing is rotated in the opposite direction as indicated by the arrow B. In this case the mercury will be transferred through tubular member 33a from chamber 18 when the liquid transfer device is in the position shown and deposited tangentially in chamber 19 and when the liquid transfer device is moved in the opposite direction the liquid will be transferred from auxiliary chamber 19 through tubular member 33 and deposited tangentially in working chamber 18 in a direction substantially parallel to the rotation of the housing.

It will be noted that the liquid transfer device is formed of two interchangeable stampings which enables the parts to be made from the same die and that it may be operated by the lever 20a to move one end of tubular member 33 and one end of tubular member 33a into the chamber 18 and that the desired amount of mercury or other liquid employed may be scooped from the chamber 18 and transferred to the chamber 19. On the other hand when the lever 20a is actuated from its neutral position in the opposite direction, all or any desired amount of the mercury will be scooped from the chamber 19 and transferred to the chamber 18 and this action takes place irrespective of the direction of rotation of the housing. The shape of the end portions 36 and 37 of tubular members 33 and 33a also aids in facilitating the operation of the device. For instance, assuming that the mercury is in reserve chamber 19 and the liquid transfer device is in neutral position, upon movement of the end portion of the device into chamber 19, the mercury within the chamber upon entering the end portion of tube 36 or 37, depending upon the direction of rotation of the housing, exerts a force which tends to pull the device farther within the chamber. The force, however, should not be sufficient to move the transfer device independently of the operating force. The latch or bolt 23 may be inserted between either of the two sets of flanges 31 and 32 to operate the device.

For the purpose of protecting the bearings from the mercury while the members are coming to rest, I preferably provide annular shedders 38 and 39, shedder 38 being provided with a downwardly extending annular flange attached to the portion 7 of the housing and shedder 39 being provided with a downwardly extending annular flange which is attached to the flange 5 of the member to be driven.

Figure 6:
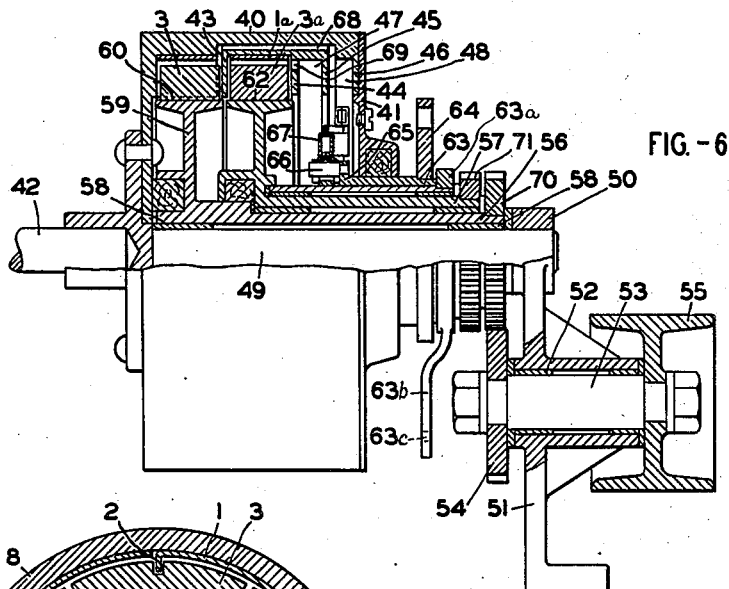
Fig. 6 is a view similar to Fig. 1 showing a modified form of my improved clutch.

Fig. 6 of the drawings shows how my improved clutch may be modified to transmit power at different speeds or to drive an external shaft in alternatively reverse directions. As illustrated, the driving means includes a housing 40 provided with a cover 41 having a plugged aperture for the insertion of mercury and is operated by a suitable shaft 42. Housing 40 is provided with a plurality of inwardly extending flanges 43, 44, 45 and 46, the flanges 43 and 44 providing chambers in which the segmental strips or clutch members 3 and 3a may be moved in a radial direction, and the flanges 45 and 46 providing a main working chamber 47 and an auxiliary working chamber 48. Extending substantially coaxial with shaft 42 within the housing is a shaft 49 journalled at its opposite end in a bearing 50 having a downwardly extending support 51 provided with a bearing 52 for supporting an externally driven shaft 53 which is provided with a gear 54 at one end and suitable power transmitting means, such as a pulley 55, at the other end.

For transmitting power in different directions or at different speeds two driven shafts 56 and 57 are provided, driven shaft 56 being adapted to be rotated on suitable bearings 58 surrounding the shaft 49 and being provided with an outwardly extending peripheral flange 59 adjacent its inner edge which terminates in a clutch surface 60. The second driven shaft 57 is likewise provided with an outwardly extending peripheral flange terminating in a clutch surface 62 extending between flanges 43 and 44. A stationary shaft 63 surrounds shaft 57 and serves as a bearing for the control device 64 having one end extending through a central opening in the cover 41 and being provided with a lug 65 to which is secured a latch 66 for operating a suitable liquid transfer apparatus 67.

As shown in the drawings, when mercury is in chamber 48 and the driving member is brought up to speed, the mercury will flow through openings 68 and when the centrifugal motion of the housing causes it to assume an annular form, its buoyant force upon the segmental strips 3 will force them inwardly forming a driving connection between the driven member and the clutch surface 60, whereby driven shaft 56 is rotated upon the bearings 58 of shaft 49. On the other hand when the mercury is transferred to chamber 47 as the driving member is brought up to speed mercury will flow through openings 69 and its buoyant effect upon assuming an annular form will force segmental strips 3a radially inward into engagement with the clutch surface 62, thereby causing a driving connection between the driving member and the driven member or shaft 57. The outer end of driven shafts 56 and 57 may be provided with gears 70 and 71. Gear 70 may be operatively associated with gear 54 to provide forward rotation of shaft 53 and gear 71 is adapted to be connected through a train of gears, not shown, by means of which gear 54 may be operated in a reverse direction, although obviously gear 71 may have a higher or lower gear ratio than gear 70, thus providing means for operating shaft 53 at slower or higher speeds.

Control device 64 may be operated in any desired manner to transfer liquid from one chamber to the other, the liquid transfer device being similar to that shown in Fig. 1. For instance, it may be provided with a lever as shown in Fig. 1 of the drawings.

Stationary shaft 63 may be prevented from rotating in any desired manner. As shown, it is provided with a collar 63a from which a flange 63b depends, the flange being provided with apertures 63c to receive screws or bolts for attachment to a suitable support.

Figure 8:
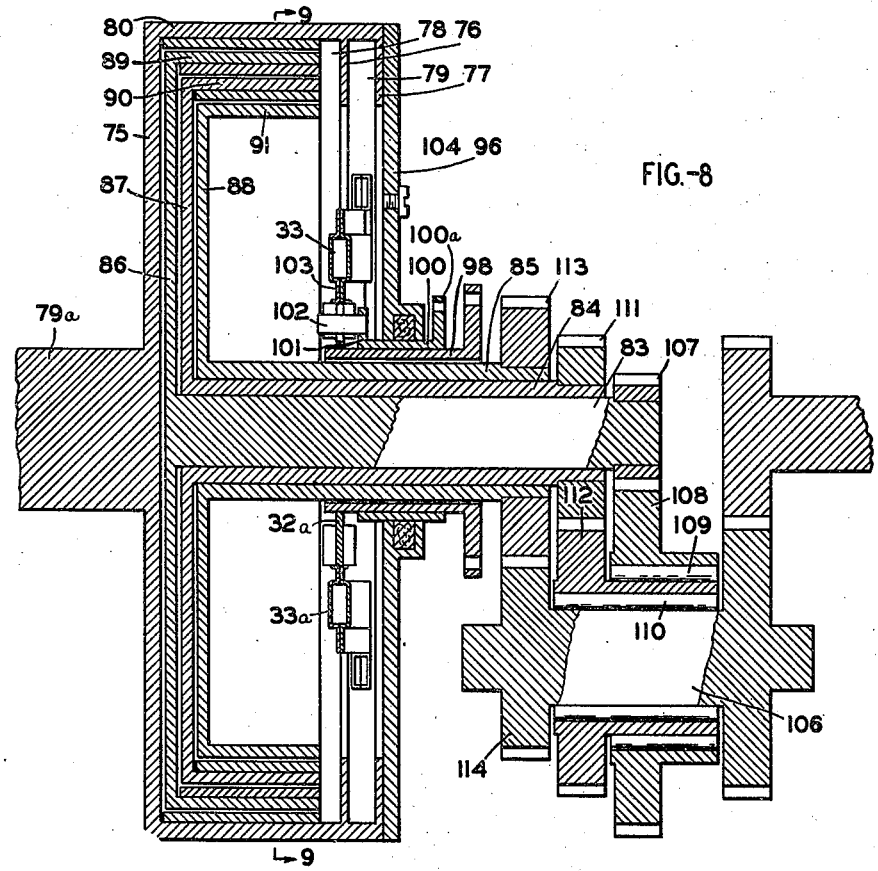
Fig. 8 is a cross sectional view of another modification of my improved clutch taken on the line 8—8 of Fig. 9.
Figure 9:
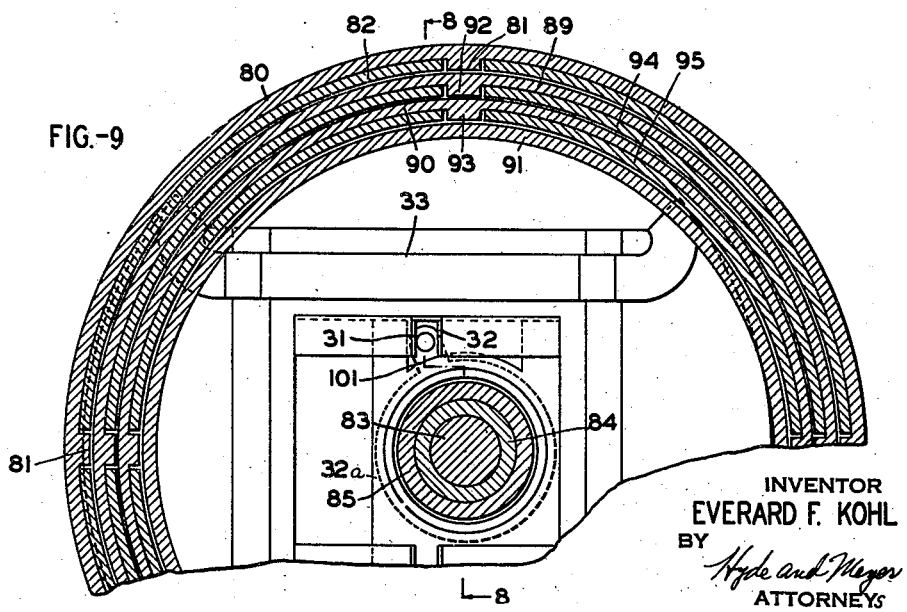
Fig. 9 is a cross sectional view on the line 9—9 of Fig. 8.

Figs. 8 and 9 illustrate another form of my invention in which the housing 75 is provided with inwardly extending peripheral flanges 76 and 77 forming a working or main chamber 78 and a reserve or auxiliary chamber 79 and is driven by a shaft 79a. In this form of the invention the peripheral portion 80 of the driving member is provided with a plurality of inwardly extending driving lugs 81 between which are interposed a plurality of segmental strips 82 which are adapted to be rotated by the driving member. Extending within the housing are a plurality of driven members 83, 84 and 85 which as shown are arranged in the form of shafts in telescopic arrangement with each other and are provided at their inner end with outwardly extending peripheral portions 86, 87 and 88, respectively, which terminate in horizontally extending annular flanges 89, 90 and 91, the outer portion of each of which constitutes clutch surfaces. Flanges 89 and 90 are also each provided with a plurality of inwardly extending driving lugs 92 and 93, between which are interposed a plurality of segmental members 94 and 95, respectively.

The housing 80 is provided with a cover 96 having an aperture closed by a removable plug for inserting the mercury and a central opening to receive the driven shafts, one end of a stationary sleeve 98 having an external flange by means of which the clutch may be suitably supported, and the sleeve 100 of a control device 100a which is rotatably mounted upon stationary sleeve 98. Control device 100a is provided with a lug 101 having a latch 102 for attaching the control device to a suitable liquid transfer means, such as that shown in Fig. 1, designated generally in Fig. 8 by the numeral 103, by means of which the mercury may be transferred between the auxiliary and reserve chambers.

Assuming the mercury is in reserve chamber 79, when the control device is rotated to move the offset portions of tubes 33 and 33a into chamber 79 a short distance, a predetermined amount of mercury will be withdrawn from reserve chamber 79 and transferred to the working chamber 78 during the rotation of the driving member. If only a sufficient amount of mercury is transferred from the reserve chamber to the working chamber to force segments 82 into contact with clutch surface 89 during the rotation of the housing, a driving connection will be established between the driving member and the driven shaft 83 while the remainder of the shafts will remain idle. Upon actuating the control device farther in the same direction the end portion of the tubes 33 and 33a will be extended farther into the reserve chamber 79 and a greater quantity of mercury will be transferred from the reserve chamber to the working chamber. Assuming that the amount of mercury transferred is only sufficient to cause the segmental members 94 to engage the clutch surface 90 of the driven shaft 84, it will be apparent that during the rotation of the driven member both shafts 83 and 84 will be driven and shaft 85 will remain idle. When sufficient mercury is transferred from the reserve chamber to the working chamber by actuating the control device farther in the same direction, all three of the driven shafts may be simultaneously rotated during the rotation of the housing. As shown in Figs. 8 and 9 of the drawings the control device has been moved to a position in which all the mercury is transferred to working chamber 78 from reserve chamber 79.

As shown in Fig. 8 of the drawings, the driven shafts may be utilized for driving an external shaft 106 at various speeds. For instance, the shaft 83 may be provided with a small gear or pinion 107 which is in mesh with a gear 108 and drives the shaft 106 through a plurality of overrunning clutches 109 and 110, the shaft 84 may be provided with a gear or pinion 111 of a larger ratio than the pinion 107 which is adapted to mesh with a gear 112 of a smaller ratio than gear 108 which is connected to shaft 106 through overrunning clutch 110, and driven shaft 85 may be provided with a gear 113 of a larger ratio than gear 111 which is adapted to mesh directly with a pinion 114 on shaft 106.

The overrunning clutches may be of such a type that when both shafts 83 and 84 are being driven the pinion 107 in mesh with gear 108 will have no effect upon the operation of shaft 106 and when all three shafts are being driven gears 107 and 111 will have no effect upon the driving of shaft 106. The overrunning clutches are well known in the art and are shown merely in diagrammatic manner and constitute no part of the present invention.

When it is desired to return the clutch to neutral position, control device 100a may be operated in the reverse direction and the mercury will be scooped from the main or working chamber and transferred into the reserve or auxiliary chamber 79.

A modified form of the liquid transfer device is disclosed in Figs. 10 to 12, inclusive, of the drawings, and its use in association with a clutch of the type shown in Fig. 1 is shown in Fig. 13. As illustrated, the device is formed of upper, intermediate and lower parts 120, 121 and 123, respectively. The intermediate part is provided with an opening 124, an offset portion 125 spaced from one edge of the central opening which terminates at one end in an arcuate portion 126, and an oppositely inclined offset portion 127 spaced from the other edge of the central opening which terminates in an arcuate portion 128. The upper and lower parts 120 and 123 are similar in appearance and are fixed in spaced relation to the central part 121 to provide a passageway for the liquid. For this purpose a pair of stampings 129 and 130 are secured in any suitable manner, such as by means of welding or brazing, to the opposite sides of the parts 123 and the opposite sides of the lower portion of part 121, and a pair of stampings 131 and 132 are secured by welding or other suitable means to the opposite sides of part 120 and the opposite sides of the upper portion of central part 121. From the drawings, it will be noted that the lower edge of part 120 and the upper edge of part 121 are shaped to provide an upper passage 133 having a longitudinal portion which terminates in arcuate end portions and in a like manner the upper edge of part 123 and the lower edge of part 121 are shaped to provide a lower passage 134 having a longitudinal portion which terminates in arcuate shaped end portions. By providing the passages in this manner, liquid may enter one end of the passage in a direction which is substantially tangential to the rotation of the housing and is delivered in a direction substantially tangential to the direction of rotation, thus eliminating splashing of the liquid.

The liquid transfer device shown in Figs. 10 to 12, inclusive, of the drawings, may be slidably mounted in the clutch housing in any desirable manner. As illustrated, the sleeve 14 is provided with a guide 135 similar to guide 32a shown in Fig. 7 of the drawings and the liquid transfer device is mounted for slidable movement upon the guide. To facilitate assembly a longitudinal strip is cut out of the lower portion of stamping 131 and a similar strip is cut out of the upper portion of stamping 129 and after the device has been inserted upon guide 135, strips 136 and 137 are inserted in place of the cut-out portions, the strips 136 and 137 being secured to the central part 121 and stampings 132 and 130, respectively, by any suitable means, such as screws or bolts 138 and 139.

To effect movement of the transfer device upon the guide the upper part 120 and stampings or strips 131 and 132 are provided with alined slots adapted to slidingly receive a pin 140 which upon the rotation of arm 20a in either direction from a central point moves the device, the movement of the device in either direction being limited by the engagement of the device at opposite ends of the opening with the guide 135. Since pin 140 is slidably mounted in its slot, during the movement of the device the pin rises and falls in the slot, thus compensating for the rotary movement of the pin. The device is operated in the same manner as the liquid transfer device shown in Figs. 2, 4, 5 and 7. In this modification, however, pin 140 engages the upper portion of the transfer device and consequently less movement of the arm 20a is required to effect the desired movement of the device in either direction from its central position. The device may also be more readily assembled upon the guide.

What I claim is:

1. Apparatus of the class described, comprising a rotatable housing containing a liquid and having a main chamber and an auxiliary chamber, a control device movable in opposite directions from a neutral position, and a liquid transfer means operatively associated with said control device and having end portions, one of said end portions being positioned adjacent the auxiliary chamber and the other end portion being positioned adjacent the main chamber when said control device is in neutral position, and said liquid transfer means being effective during the rotation of said housing in transferring the liquid from the auxiliary chamber to the main chamber when the control device is moved in one direction from its neutral position and being effective in transferring the liquid from the main chamber to the auxiliary chamber when said control device is moved in the opposite direction from its neutral position.

2. Apparatus of the class described, comprising a rotatable housing containing liquid and having a main chamber and an auxiliary chamber, a control device, a guide arranged in said housing, liquid transfer means slidably mounted on said guide and having end portions, one of said end portions being in proximity to the main chamber and the other end portion being in proximity to the auxiliary chamber when the control device is in a neutral position, said control device being adapted to be moved in one direction from its neutral position to move one of the end portions of said liquid transfer means into the auxiliary chamber to transfer liquid from the auxiliary chamber to the main chamber during the rotation of said housing and said control device being adapted to be moved in the opposite direction from its neutral position to move the other end portion of the liquid transfer device into the main chamber to transfer liquid from the main chamber to the auxiliary chamber during the rotation of said housing.

3. Apparatus of the class described comprising a rotatable housing containing a liquid and having a main chamber and an auxiliary chamber, a control device movable in opposite directions from a neutral position, liquid transfer means associated with said control device having offset end portions, one of said end portions being adapted to extend into the main chamber when the control device is moved in one direction from its neutral position to transfer liquid from the main chamber to the auxiliary chamber during the rotation of said housing and the other end portion being adapted to extend into the auxiliary chamber to transfer liquid from the auxiliary chamber to the main chamber when the control device is moved in a different direction from its neutral position during the rotation of said housing.

4. Apparatus of the class described comprising a driving member, a member to be driven, a housing containing a body of liquid associated with said members and being adapted to be rotated by one of them, said housing having a main chamber and an auxiliary chamber, means associated with the driving member and the member to be driven for effecting a driving engagement between them during the rotation of said housing when the liquid is in the main chamber, a control device movable in opposite directions from a neutral position and means arranged in said housing and being responsive to the movement of the control device in one direction from its neutral position for transferring the liquid from the main chamber to the auxiliary chamber during the rotation of said housing, said means being responsive to the movement of the control device in the opposite direction from its neutral position for transferring liquid from the main chamber to the auxiliary chamber during the rotation of said housing.

5. Apparatus of the class described comprising a driving member, a member to be driven, a housing having a plurality of chambers, said housing being adapted to be rotated by one of said members, a plurality of clutch elements arranged in one of said chambers and operatively connected with one of said members to rotate therewith but movable radially thereof, a clutch surface on the other member positioned radially inward of said elements and adapted to be engaged thereby, a body of liquid arranged in said housing for transmitting power from the driving member through said elements to the driven member upon rotation of the driving member, a control device movable in opposite directions from a neutral position and means responsive to the movement of said control device in opposite direction from its neutral position for transferring liquid between said chambers during the rotation of said housing.

6. Apparatus of the class described comprising a driving member, a member to be driven, a housing containing a body of liquid associated with and being adapted to be driven by one of them, said housing being provided with a peripheral member extending radially inward and dividing the housing into a main chamber and an auxiliary chamber, means associated with the driving member and the driven member for effecting a driving engagement between them when the liquid is in the main chamber and the housing is rotating, a control device movable in opposite directions from a neutral position, and liquid transfer means operatively associated with said control device including a pair of tubes associated together to be moved as a unit, each of said tubes having end portions extending in a direction opposite to the end portions of the other tube, said liquid transfer means being arranged in said housing so that one end of the liquid transfer means is in proximity to said auxiliary chamber and the other end portion is in proximity to the main chamber when the control device is in neutral position, and said control device being adapted to be actuated in one direction from its neutral position to move one end of the liquid transfer means into said auxiliary chamber to transfer liquid from the auxiliary chamber to the main chamber during the rotation of said housing in either direction and the other end portion of said liquid transfer means being adapted to be moved into the main chamber to transfer liquid from the main chamber to the auxiliary chamber during the rotation of said housing when the control device is moved in the opposite direction, irrespective of the direction of rotation of said housing.

7. Apparatus for transferring liquid between two chambers in a rotatable housing, comprising a substantially flat member having a central opening and a tubular member at opposite sides thereof, said flat portion including the two tubular members having end portions, one of which is offset in a direction opposite to the other, whereby one end portion may be moved into one chamber and the opposite end portion may be positioned to transfer liquid into a second chamber, the tubes at one end of said apparatus being arcuately shaped in directions opposite to each other to facilitate removal of the liquid during the rotation of said housing from the first chamber for transfer to the second chamber irrespective of the direction of rotation of said housing.

8. Apparatus for transferring liquid between two chambers in a rotatable housing, comprising a substantially flat member having a central opening and a tubular member at opposite sides thereof, said flat portion including the two tubular members having end portions, one of which is offset in a direction opposite to the other, the tubes at one end of said apparatus being arcuately shaped in directions opposite to each other to facilitate removal of the liquid during the rotation of said housing from the first chamber for transfer to the second chamber, irrespective of the direction of rotation of said housing, and the tubes at the other end of said apparatus being arcuately shaped in directions opposite to each other to discharge the liquid in a direction substantially tangentially to the direction of rotation of said housing irrespective of its direction of rotation.

9. Apparatus for transferring liquid between two chambers in a rotatable housing, comprising a substantially flat member having a central opening and a tubular member at opposite sides thereof, said flat portion including the tubular members having end portions offset in opposite directions whereby when one end portion is moved into one chamber, the opposite end portion may be positioned to transfer liquid into the other chamber and said apparatus being provided with outwardly extending flanges adapted to receive an actuating device.

10. Apparatus of the class described comprising a driving member, a first and second member to be driven, a housing containing a body of liquid associated with said members, said housing having a main chamber and an auxiliary chamber, means associated with the driving member and the first member to be driven for effecting a driving engagement between them when the liquid is in the main chamber and said housing is being rotated, a control device movable in opposite directions from a neutral position, means responsive to the movement of the control device in one direction from its neutral position for transferring the liquid from the main chamber to the auxiliary chamber during the rotation of said housing, and means associated with the driving member and the second member to be driven for effecting an engagement between them when the liquid is in the auxiliary chamber and the housing is being rotated.

11. Apparatus as set forth in claim 10 including means for transferring the liquid from the auxiliary chamber to the main chamber during the rotation of said housing when the control device is moved in the opposite direction from its neutral position.

12. Apparatus of the class described comprising a driving member, a member to be driven, a housing containing a liquid associated with said driving member and rotatable therewith, said housing having a working chamber and a reserve chamber, a movable control device, liquid transfer means having one end extending in proximity to said reserve chamber and the other end extending into said working chamber, said control device being adapted to be actuated to move said liquid transfer device to a position to transfer a portion of the liquid from said reserve chamber into said working chamber, and means associated with said driving member and the member to be driven for effecting a driving engagement between them during the rotation of said housing when a predetermined amount of liquid has been transferred from the reserve chamber to the working chamber.

13. Apparatus of the class described comprising a driving member, a plurality of members to be driven, a housing containing a liquid associated with said driving member, said housing having a working chamber and a reserve chamber, a movable control device, liquid transfer means having one end arranged in proximity to said reserve chamber and the other end extending into said working chamber, said control device being adapted to be actuated to move said liquid transfer means to a position to transfer a portion of said liquid from said reserve chamber into said working chamber, and means associated with said driving member and one of the members to be driven for effecting a driving engagement between them during the rotation of the driving member when a predetermined amount of liquid has been transferred from the reserve chamber to the working chamber, means responsive to the further actuation of the control device in the same direction for transferring a further quantity of liquid from the reserve chamber to the working chamber, and means responsive to the transfer of the additional liquid into the working chamber for effecting a driving connection between said driving means and a plurality of said driven members.

14. Apparatus as defined in claim 13 including means responsive to the movement of the control device in the opposite direction for transferring liquid from the working chamber into the reserve chamber.

15. Apparatus of the class described comprising a driving member including a rotatable housing containing a liquid, and having a main chamber and an auxiliary chamber, a plurality of members to be driven, a movable control device, liquid transfer means operatively associated with said control device having one end arranged in proximity to said main chamber and the other end in proximity to said auxiliary chamber when the control device is in neutral position, a plurality of clutch elements having less specific gravity than said liquid arranged between said housing and each of the members to be driven and being adapted to be buoyantly forced into engagement with the driven members by said liquid, and means whereby said control device may be operated to transfer liquid between said chambers, the presence of at least a portion of said liquid in the main chamber being effective in causing an engagement between said driving member through at least a portion of said clutch elements with one of said driven members during the rotation of said housing and the presence of at least a portion of said liquid in the auxiliary chamber being effective in causing an engagement between said driving member through a portion of said clutch elements with another driven member during the rotation of said housing.

16. Apparatus of the class described comprising a rotatable housing containing a liquid and having a main chamber and an auxiliary chamber, a control device movable in opposite directions from a neutral position, and a liquid transfer means arranged in said housing including conduit means having one orifice arranged adjacent the main chamber and its other orifice arranged adjacent the auxiliary chamber when the control device is in neutral position, said conduit means being movable in said housing in response to the movement of said control device in either direction from its neutral position for transferring liquid between said chambers upon rotation of said housing.

17. Apparatus of the class described comprising a rotatable housing containing a liquid and having a main chamber and an auxiliary chamber, a control device movable in opposite directions from a neutral position and movable conduit means for transferring liquid between said chambers, said conduit means being connected to said control device and being movable during the rotation of said housing in response to the movement of said control device in one direction from its neutral position for transferring liquid from the auxiliary chamber to the main chamber and being movable during the rotation of said housing in response to the movement of the control device in the opposite direction from its neutral position for transferring liquid from the main chamber to the auxiliary chamber.

18. Apparatus of the class described comprising a rotatable housing containing a liquid and having two chambers, said housing having an opening at one end, a stationary sleeve extending into said housing through said opening, movable conduit means arranged entirely within said housing and having orifices at opposite ends for transferring liquid between said chambers and a control device rotatable on said sleeve and operable from outside said housing for moving said conduit means.

19. Apparatus of the class described comprising a driving member including a rotatable housing having an auxiliary chamber and a working chamber, a driven member, a stationary sleeve surrounding the driven member, means for transferring liquid from the auxiliary chamber to the working chamber during the rotation of said housing, means responsive to the transfer of liquid to said working chamber for causing rotation of said driven member, and a control device rotatable on said sleeve and operable from outside said housing for moving said liquid transfer means.

20. Apparatus for transferring liquid between two adjacent chambers in a rotatable housing comprising an upper member, a central member having an opening therein to form upper and lower edge portions for engaging a guide and a lower member, said upper and lower members being spaced from said central member and each member having end portions which are offset in directions opposite to each other, means arranged on opposite sides of the upper and central member and secured thereto for forming a passageway for liquid between the upper and central member, and means arranged on the opposite sides of the central and lower member and secured thereto for forming a passageway for liquid between the central and lower members.

21. Apparatus for transferring liquid between two adjacent chambers in a cylindrical rotatable housing including a tubular member having a substantially straight central portion and end portions offset from the central portion in directions opposite to each other, one of said end portions being adapted to extend into one chamber and the other end portion being adapted to extend into the other chamber, the ends of the offset portions of said tubular member being shaped to provide a bore arcuately inclined at substantially the same angle as the interior periphery of the housing to facilitate removal of liquid rotating in the periphery of one chamber in a direction which is substantially tangential to the direction of rotation of liquid and to transfer it to the periphery of the second chamber in a direction which is substantially tangential to the direction of rotation of the liquid in the second chamber.

22. Apparatus of the class described comprising a rotatable housing containing a liquid and having two adjacent chambers, and means for transferring liquid between said chambers including a movable tubular member, the ends of which are offset in directions opposite to each other with one end extending into one chamber and the other end extending adjacent the other chamber, the extremity of one of said offset portions being shaped to provide a bore arcuately inclined at substantially the same angle as the interior periphery of the housing to facilitate removal of the liquid from one chamber in a direction substantially tangential to the direction of rotation of the liquid in said housing when the tubular member is moved into that chamber and the extremity of the other offset portion being shaped to provide a bore arcuately inclined at substantially the same angle as the periphery of the housing to discharge liquid into the other chamber in a direction which is substantially tangential to the direction of rotation of the liquid in said housing.

23. Apparatus of the class described comprising a rotatable housing containing a liquid and having two chambers, conduit means for transferring liquid between said chambers arranged within and being movable in said housing, said conduit means having end portions which are offset in directions opposite to each other, each of said end portions being provided with an orifice, and a movable control device associated with said conduit means and being operable from outside of said housing for moving said conduit means in opposite directions, the movement of said control device in one direction being adapted to move the conduit means to a position in which one end is in proximity to the periphery of one of said chambers and the movement of the control device in the opposite direction being adapted to move the conduit means to a position in which its opposite end is in proximity to the periphery of the other chamber.

24. Apparatus for transferring liquid between two adjacent chambers in a rotatable housing comprising two members in spaced relation to each other, each of said members having end portions offset in directions opposite to each other and strips arranged on opposite sides of said members and secured thereto for forming a passageway for liquid between said members, one of said members being provided with an opening spaced from the passageway to receive a guide and one of said strips being extended beyond said opening for embracing one side of said guide.

EVERARD F. KOHL.